US012608338B1

(12) United States Patent
Karuppusamy et al.

(10) Patent No.: US 12,608,338 B1
(45) Date of Patent: Apr. 21, 2026

(54) PHYSICAL ENUMERATION OF A DISTRIBUTED NAMESPACE IN A DISTRIBUTED FILE SYSTEM

(71) Applicant: Dell Products L.P., Round Rock, TX (US)

(72) Inventors: Ramesh Kannan Karuppusamy, Bengaluru (IN); Lomesh Vasant Meshram, Bengaluru (IN); Arun Kumar, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/016,599

(22) Filed: Jan. 10, 2025

(51) Int. Cl.
*G06F 16/11* (2019.01)
*G06F 11/1446* (2026.01)
*G06F 12/02* (2006.01)
*G06F 16/182* (2019.01)

(52) U.S. Cl.
CPC ........ *G06F 16/128* (2019.01); *G06F 11/1469* (2013.01); *G06F 12/0253* (2013.01); *G06F 16/182* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 2014/0189267 A1* | 7/2014 | Qi ......................... | G06F 16/128 |
| | | | 711/158 |
| 2015/0331790 A1* | 11/2015 | Kishi .................. | G06F 12/0246 |
| | | | 711/103 |
| 2023/0080046 A1* | 3/2023 | Paul ...................... | G06F 16/128 |
| | | | 707/822 |
| 2024/0061814 A1* | 2/2024 | Visvanathan ....... | G06F 12/0253 |

* cited by examiner

*Primary Examiner* — Eddy Cheung
(74) *Attorney, Agent, or Firm* — Chamberlain, Hrdlicka, White, Williams & Aughtry; Aly Z. Dossa

(57) ABSTRACT

A method for managing storage of data in a distributed namespace (DNS) system includes obtaining, by a garbage collection (GC) agent of a computing node in the DNS system, a request for processing a set of pages in a file system, each page being associated with one of a plurality of either dataful or dataless snapshots. In response to the request, the GC agent performs a page processing on each page in the set of pages based on an association to a dataless or dataful snapshot of each page to obtain a subset of the pages, and performs, using a data manager of the computing node, a physical enumeration of the subset of the pages to obtain a managed storage of the DNS system, wherein the managed storage is cleaned based on data not associated with the subset of pages.

20 Claims, 8 Drawing Sheets

PHYSICAL ENUMERATION OF A DISTRIBUTED NAMESPACE IN A DISTRIBUTED FILE SYSTEM

BACKGROUND

Distributed namespaces in a distributed file system may utilize computing devices across various physical regions. The management of the distributed namespaces by the computing devices may include using dataless and dataful snapshots. The enumeration of items in the distributed namespace using the aforementioned snapshots may consume computing resources of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
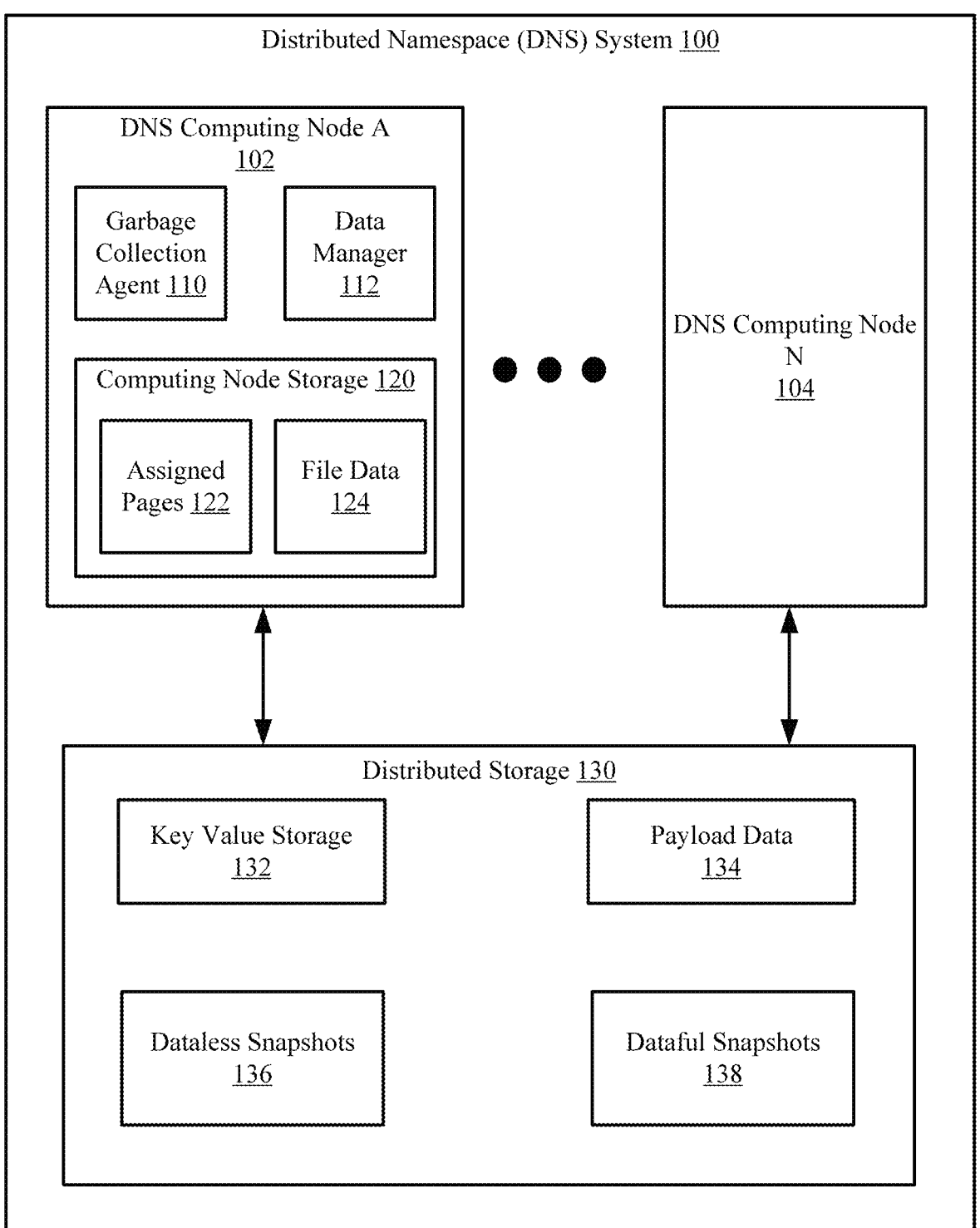
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

Embodiments of the invention include systems and methods for managing garbage collection of data for computing nodes. Specifically, embodiments of the invention include using computing nodes (also referred to as distributed namespace (DNS) computing nodes) in a DNS system to process assigned pages of the distributed namespace (DNS) based on whether the pages correspond to a dataless or a dataful snapshot to minimize computing resources when enumerating an entire namespace using multiple DNS computing nodes.

In one or more embodiments, DNS refers to an organization of items (also referred to as pages) organized using, for example, a hierarchical structure (e.g., a B+tree), with a root page representing a highest order in the hierarchal structure, internal pages represented under the root page, and leaf pages in the lowest order in the hierarchical structure. The DNS may be managed by a collection of DNS computing nodes (See FIG. 1).

A snapshot may refer to a data structure that describes the hierarchical structure of all pages existing at a point in time. The snapshot may specify the child pages of each internal page and root page, and the corresponding payload data (described in FIG. 1). The snapshots may be dataful (e.g., store the file data in addition to the metadata), or dataless (e.g., only store the metadata). Each page may be referenced by one or more snapshots. Further, snapshots may be deleted, making them no longer present in the DNS system.

During a process of logical enumeration, a logical walk of the pages in the DNS may be performed (highest order pages first) to obtain relevant metadata of each page. Each internal page and root page may include relevant metadata such as a list of other pages (e.g., internal and/or leaf) under the internal or root page. The pages under an internal or root page may be referred to as children pages to the parent page. The metadata is processed to determine which file data is to be protected from garbage collection (e.g., which file data is to not be deleted or otherwise removed from the file data of the DNS system).

One or more disadvantages to the process of logical enumeration as described above is based on the use of snapshots by the DNS system. For example, pages referenced by multiple snapshots may be processed multiple times under a logical enumeration. Further, only pages of dataful snapshots are required for enumeration. However, pages in dataless snapshots may be referenced by dataful snapshots. Further, any parallel processing of a set of pages referenced by multiple snapshots may result in inefficiently processing pages multiple times across multiple computing nodes in the DNS system.

To address the disadvantages of logical enumeration as described above, embodiments of the invention provide a mechanism of physical enumeration of the DNS that enables efficient use of parallel processing. In physical enumeration, each DNS computing node may be assigned a subset of the DNS pages to perform a page processing in parallel such that the DNS computing nodes, collectively, enumerate the complete DNS for pages referenced by all present snapshots.

In logical enumeration, the logical walk is done in top-down manner from root to leaf pages. In such scenarios, there is no issue to determine if a page belongs to a dataless or dataful snapshot. If a page is accessible from a dataless snapshot, there is no need to enumerate it as part of this snapshot. But if the same page is accessible from a dataful snapshot, this page will be enumerated.

In contrast to a logical enumeration, in a physical enumeration, a logical walk may not be viable, as pages may be distributed among the DNS computing nodes (or may be processed out of order across multiple DNS computing nodes), and each page may not include additional connections to leaf pages or other internal pages outside of its corresponding children pages. As such, the logical walk of a hierarchical structure may not be available during physical enumeration or may be more resource-consuming than a logical enumeration. Additionally, the physical enumeration of the DNS may be useful for processing pages of any dataful snapshots, and conversely, processing pages that are only associated with dataless snapshots may be considered a waste of computing resources for the DNS computing nodes. To address the limitations of a physical enumeration, embodiments of the invention provide efficient page processing of pages referenced by a set of snapshots (e.g., using FIGS. 3A-3B) prior to the physical enumeration for the purpose of preventing redundancy in processing pages.

Various embodiments of the invention are described below.

FIG. 1 shows a diagram of a system in accordance with one or more embodiments of the invention. The system may be referred to as a distributed namespace (DNS) system (100). The DNS system (100) includes any number of DNS computing nodes (102, 104) and a distributed storage (130). The DNS system (100) of FIG. 1 may include additional, different, and/or different components without departing from the invention.

In one or more embodiments, the DNS system (100) includes functionality for providing services to users (not shown). The services may be provided using one or more DNS computing nodes (102, 104) that each use computing resources for providing the services. The services may be instances of applications, operating systems, virtual machines, and/or any other services without departing from the invention. The DNS computing nodes (102, 104) may use the distributed storage (130) of the DNS system (100) to manage any data associated with the DNS system (100).

In one or more embodiments of the invention, the DNS computing nodes (102, 104) include functionality for managing the DNS in the DNS system (100). The management of the DNS may include, for example, generating dataless snapshots (136) or dataful snapshots (138) of the DNS, generating pages and storing the pages in the key value storage (132), and providing the payload data (134) of the DNS to users (not shown).

Further, the DNS computing nodes (102, 104) each includes functionality for processing pages stored in the key value storage (132) to perform efficient garbage collection of the payload data (134) to manage storage resources of the DNS system (100).

To perform the aforementioned functionality, the DNS computing nodes (102, 104) may each include a garbage collection agent (110), a data manager (112), and computing node storage (120). Each DNS computing node (102, 104) may include additional, fewer, and/or different components without departing from the invention.

In one or more embodiments, the garbage collection agent (110) includes functionality for performing page processing of assigned pages (122) to be used for physical enumeration. The page processing may be performed, for example, in accordance with the method of FIGS. 3A-3B. The page processing may result in a subset of the assigned pages (122) to be provided to the data manager (112). The data manager (112) may receive the subset of the assigned pages (122) perform the physical enumeration as described throughout the present disclosure.

In one or more embodiments, the assigned pages (122) associated with a computing node (e.g., 102) relate one or more pages (stored in the computing node storage (120) as page identifiers) that are to be processed by the DNS computing node (102) prior to physical enumeration. The DNS computing node (102) may process the assigned pages (122) using information stored in the distributed storage (130) such as the key value storage (132). The information may include metadata associated with each page such as, for example, the corresponding snapshot, a list of child page (if applicable), and a list of any snapshots (dataful or dataless) that reference the assigned page.

To perform the physical enumeration of a subset of the assigned pages (122), the data manager (112) may use the key value storage (132) to obtain relevant metadata and to perform garbage collection of the payload data (134). The garbage collection may include identifying all files specified by the obtained pages from the garbage collection agent (110) and protecting the corresponding file data in the payload data (134) from being removed (e.g., deleted) from the distributed storage (130), or otherwise protect such file data from becoming inaccessible by the DNS. The deletion may be performed based on storage capability policies implemented on the distributed storage (130) to maintain storage availability of the distributed storage (130).

Figure 5:
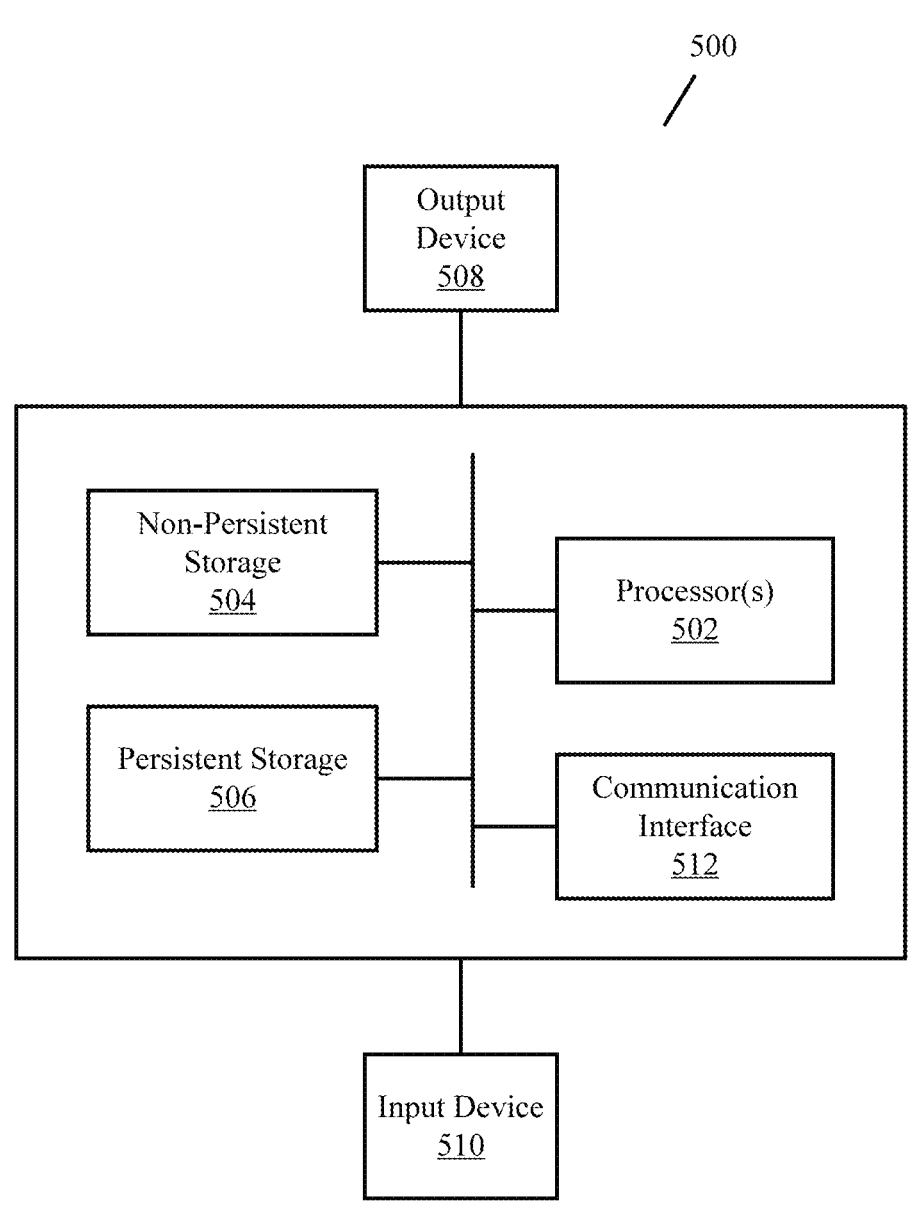
FIG. 5 shows a diagram of a computing device in accordance with one or more embodiments of the invention.

In one or more embodiments, each DNS computing node (102, 104) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the DNS computing node (102, 104) described throughout this application.

In one or more embodiments disclosed herein, each DNS computing node (102, 104) is implemented as a logical device. The logical device may utilize the computing resources of any number of computing devices and thereby provide the functionality of the DNS computing node (102, 104) described throughout this application.

In one or more embodiments, the distributed storage (130) includes a key value storage (132), the payload data (134), one or more dataless snapshots (136), and one or more dataful snapshots (138). The distributed storage (130) may include additional, fewer, and/or different data without departing from the invention.

In one or more embodiments, the distributed storage (130) is implemented as a collective of computing node storage (e.g., 120) of the DNS computing nodes (102, 104) of the DNS system (100). Alternatively, the distributed storage (130) is implemented as a separate storage system comprising one or more computing devices (e.g., FIG. 5) providing the computing resources to provide the functionality of the distributed storage (130) described throughout the present disclosure.

The key value storage (132) may be implemented as a data structure that stores entries each corresponding to one of the pages in the DNS system (100) referenced by one or more snapshots (136, 138). The entries may specify the page (e.g., using a page identifier), the snapshot from which the page was generated, and the metadata corresponding to the page. For example, if a page is an internal page (described in FIG. 2), the metadata of the page may be a list of child pages of the page. In another example, if the page is a leaf page, the metadata may specify a payload portion (described in FIG. 2) of the data used for the DNS. For example, if the DNS is a file system, the payload portion of the data may be one or more files in the file system.

As discussed above, a snapshot may refer to a data structure that describes the hierarchical structure of all pages in the DNS at a point in time (e.g., using a timestamp). The snapshot may specify the child pages of each internal page and root page, and the corresponding payload data (134). The dataful snapshots (138) may be associated with generated pages that store the file data in addition to the metadata. In contrast, the dataless snapshots (136) may be associated with generated pages that only store the metadata (e.g., the list of files). For an example collection of dataless and dataful snapshots (both present and deleted), see FIG. 4A.

Figure 2:
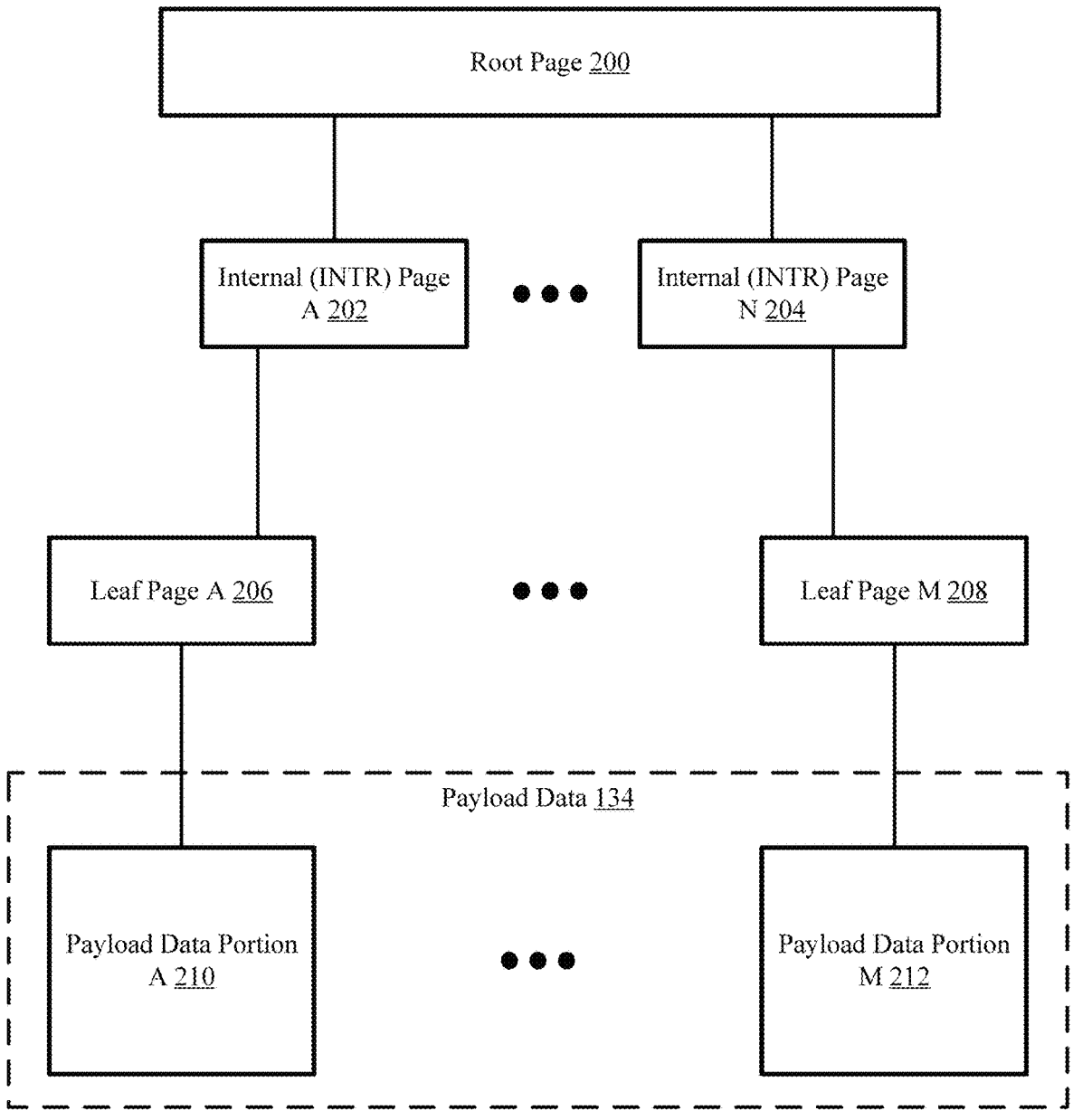
FIG. 2 shows a diagram of a hierarchical structure of pages in accordance with one or more embodiments of the invention.

For an example hierarchical structure of pages in the DNS, see FIG. 2.

FIG. 2 shows a diagram of a hierarchical structure of pages in accordance with one or more embodiments of the invention. As discussed above, DNS refers to an organization of items (also referred to as pages) organized using, for example, a hierarchical structure, with a root page (200) representing a highest order in the hierarchal structure, internal pages (202, 204) represented under the root page, and leaf pages (206, 208) in the lowest order in the hierarchical structure.

In one or more embodiments, the payload data (102) may be an embodiment of the payload data (102, FIG. 1) described above. The payload data (102) may include data used for processing by the users of the DNS. For example, the payload data (102) may include file data of all files in a file system of the DNS. Each leaf page (206, 208) may correspond to a portion (210, 212) of the payload data (102).

Figure 3A:
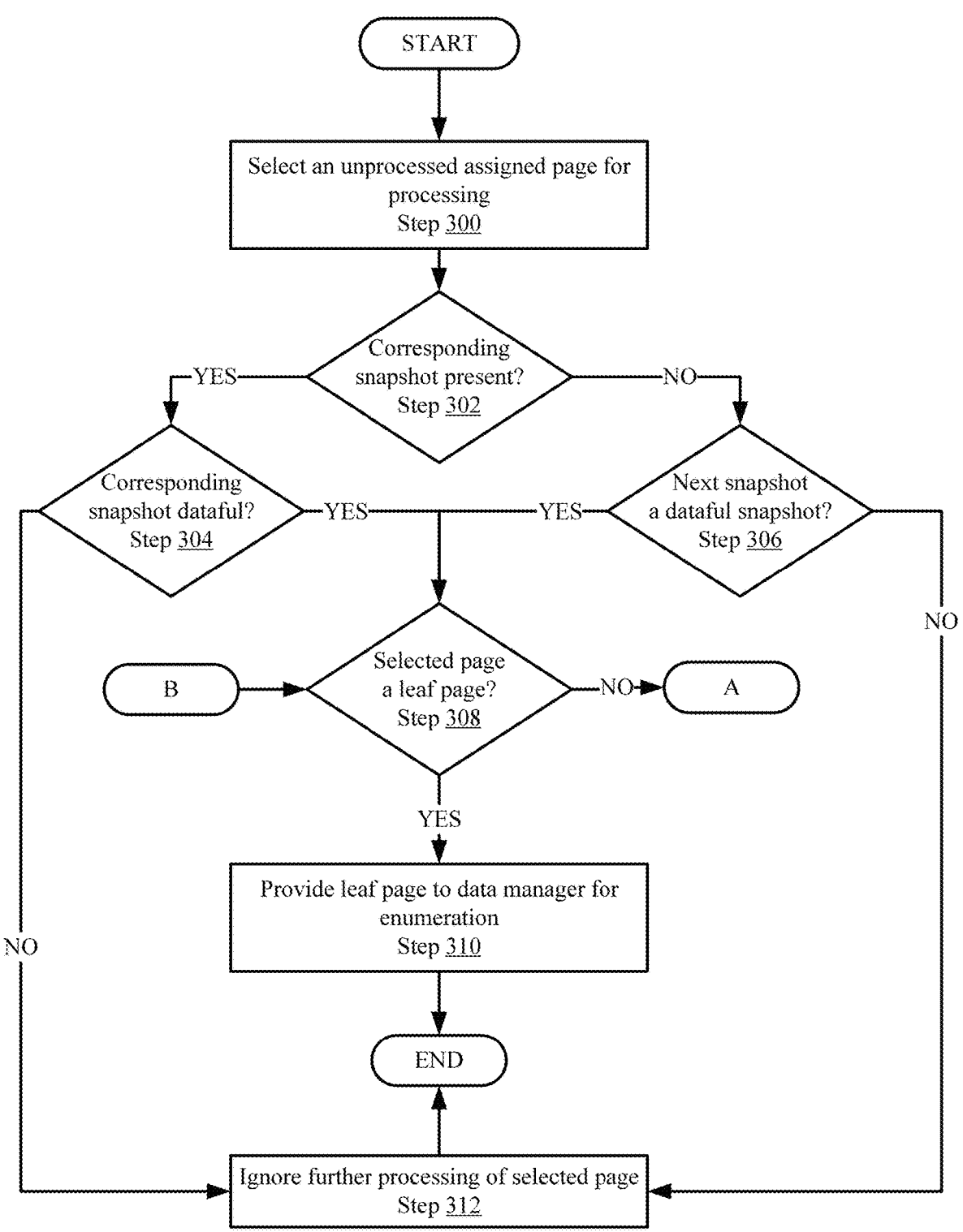
FIGS. 3A-3B show a flowchart of a method for page processing of an assigned set of pages from multiple snapshots in accordance with one or more embodiments of the invention.
Figure 3B:
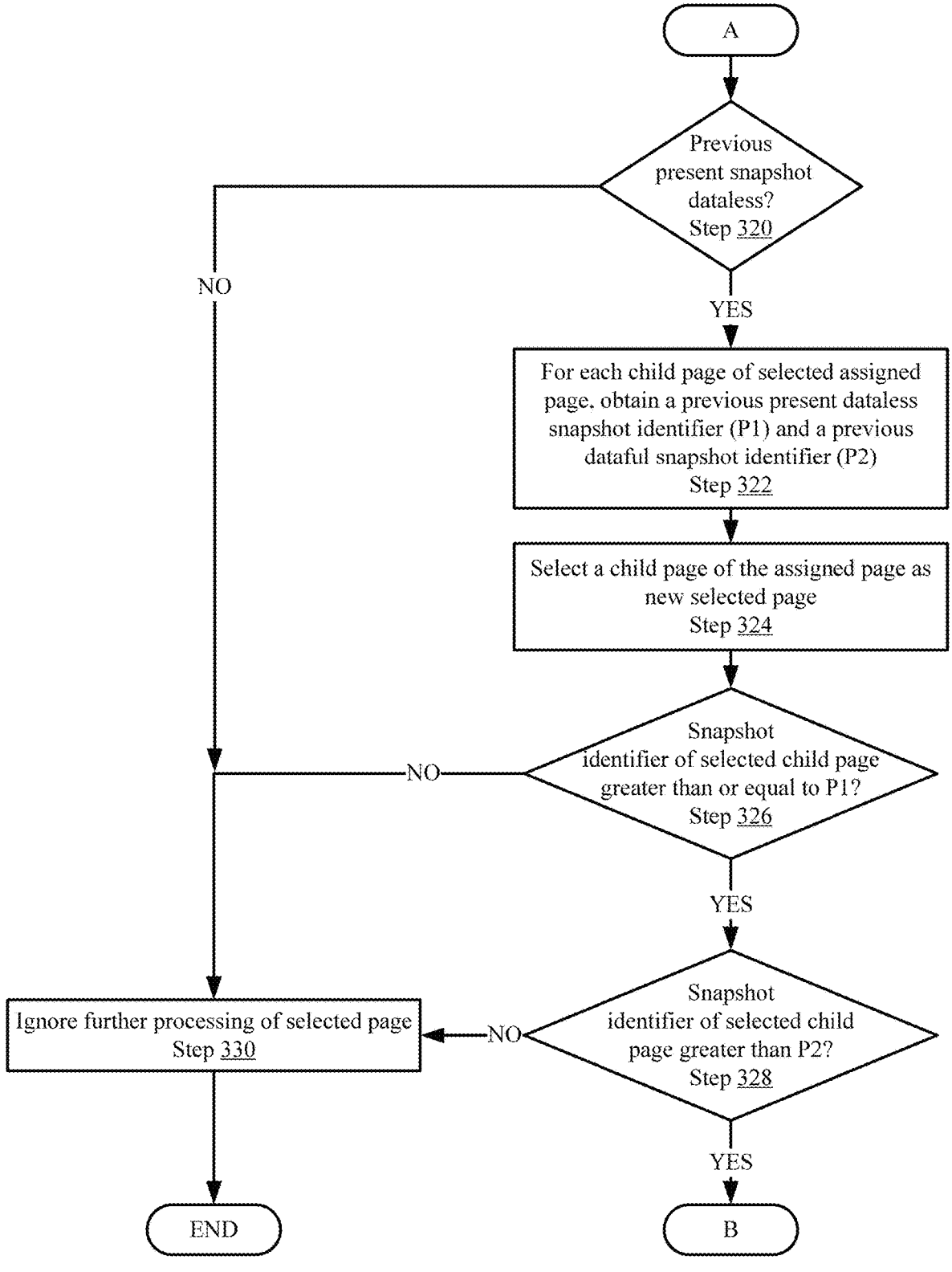

FIGS. 3A-3B show a flowchart of a method for page processing of an assigned set of pages from multiple snapshots in accordance with one or more embodiments of the invention. The method shown in FIGS. 3A-3B may be performed by, for example, a garbage collection agent (110, FIG. 1). Other components of the system illustrated in FIG. 1 may perform the method of FIGS. 3A-3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

The method of FIGS. 3A-3B may be performed for each assigned page (122) obtained by a DNS computing node (102, 104).

Turning to step 300, an unprocessed assigned page is selected for processing.

In step 302, a determination is made about whether the corresponding snapshot of the selected page is present (e.g., not deleted). The corresponding snapshot may be determined based on the page identifier of the selected page. The corresponding snapshot refers to the snapshot from which the selected page was generated. For example, if a first snapshot is generated and generates pages P1 and P2, both P1 and P2 correspond to the first snapshot. Conversely, if a second snapshot is generated and references P1 and P2 but generates a third page P3, P3 corresponds to the second snapshot, and P1 and P2 remain corresponding to the first snapshot.

If the corresponding snapshot is present, the method proceeds to step 304; otherwise, the method proceeds to step 306.

In step 304, a determination is made about whether the corresponding snapshot is a dataful snapshot. The determination of step 304 prevents processing of assigned pages corresponding to dataless snapshots. If the corresponding snapshot is a dataful snapshot, the method proceeds to step 308; otherwise, the method proceeds to step 312.

In step 306, a determination is made about whether a next snapshot (e.g., a present snapshot generated following the generation of the corresponding snapshot) of the selected page is a dataful snapshot. The determination of step 306 prevents processing of assigned pages corresponding to deleted snapshots and referenced by dataless snapshots. If the next snapshot is a dataful snapshot, the method proceeds to step 308; otherwise, the method proceeds to step 312.

In step 308, a determination is made about whether the selected page is a leaf page. The determination of step 308 may be performed based on the value of the page in the key value storage (132, FIG. 1). If the selected page is a leaf page, the method proceeds to step 310; otherwise, the method proceeds to step 320 (described in FIG. 3B).

In step 310, the leaf page is provided to the data manager (112, FIG. 1) for physical enumeration. As such, a subset of the assigned pages is obtained by the data manager. In one or more embodiments, the physical enumeration includes identifying the data stored in the obtained subset of pages and protecting such data from deletion.

In step 312, following the determination that either a present snapshot corresponding to the selected page is a dataless snapshot or that the next snapshot of a deleted snapshot corresponding to the selected page is a dataless snapshot, further processing of the selected page is ignored. As such, the assigned pages processed via step 312 are not used for the physical enumeration and/or the garbage collection by a data manager (112, FIG. 1).

Turning to FIG. 3B, following a determination that the selected page is not a leaf page (and is instead an internal page or root page), a determination is made about whether a previous present snapshot (e.g., a present snapshot generated prior to the corresponding snapshot) of the selected page is a dataless snapshot. If the previous present snapshot is a dataless snapshot, the method proceeds to step 322; otherwise, the method proceeds to step 330.

In step 322, metadata of each child page of the selected page is obtained. The metadata includes a previous present dataless snapshot identifier (P1) of each child page and a previous dataful snapshot identifier (P2) of each child page.

Steps 326-330 described below may be performed for each child page of the previously selected page (i.e., the selected page of step 300).

In step 324, a child page of the selected assigned page is selected as the new selected page.

In step 326, a determination is made about whether a snapshot identifier of the selected page (i.e., the new selected page of step 324) is the same, or greater, than the corresponding P1. If the snapshot identifier is greater than or equal to P1, the method proceeds to step 328; otherwise, the method proceeds to step 330.

In step 328, a determination is made about whether a snapshot identifier of the selected page (i.e., the new selected page of step 324) is greater than the corresponding P2. If the snapshot identifier is greater than P2, the method proceeds to step 308 (described in FIG. 3A), with the selected page referred to in step 308 corresponding to the new selected page of step 324; otherwise, the method proceeds to step 330.

In step 330, the selected page is ignored for further processing.

EXAMPLE

Figure 4A:
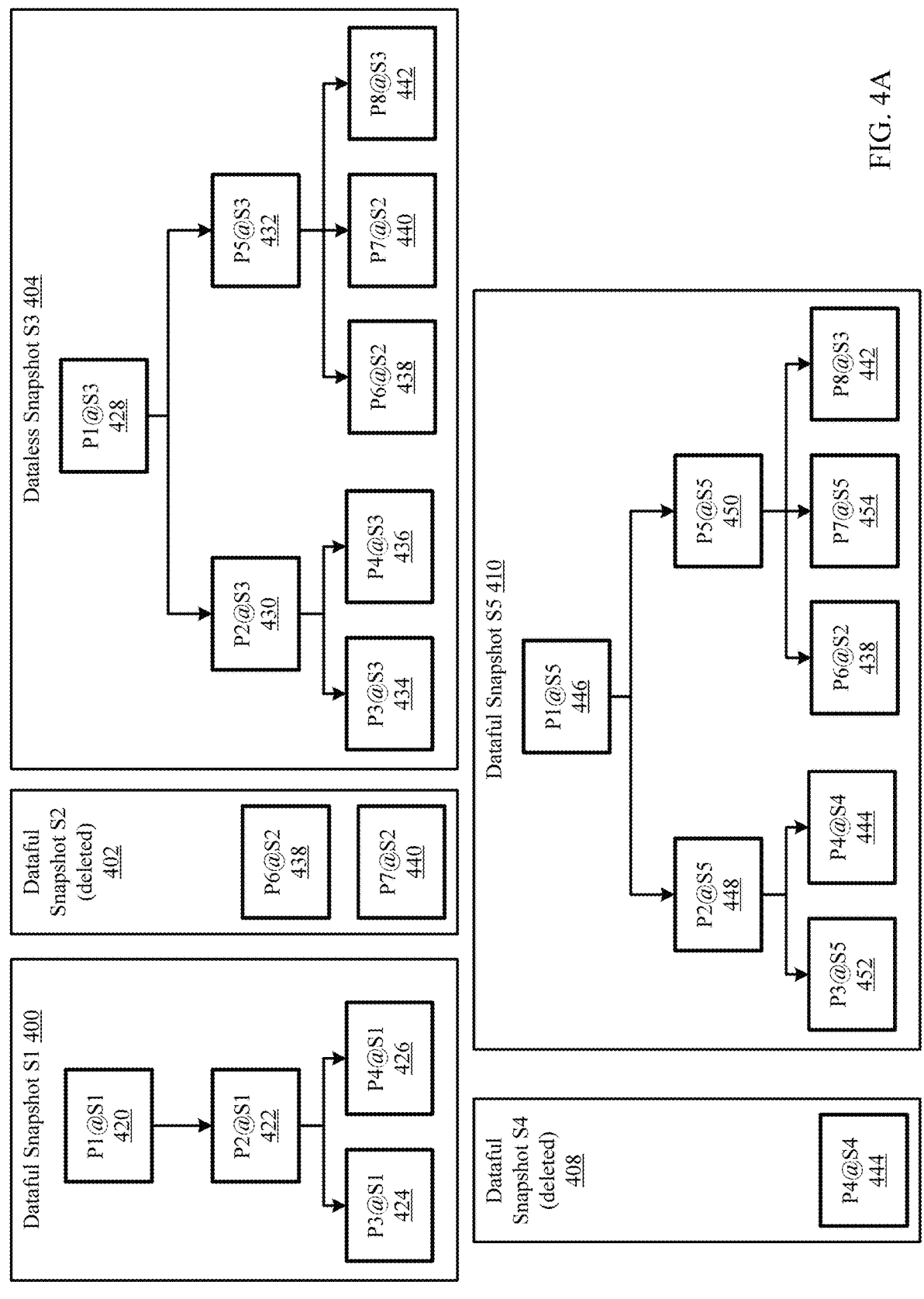
FIGS. 4A-4C show an example in accordance with one or more embodiments of the invention.
Figure 4B:
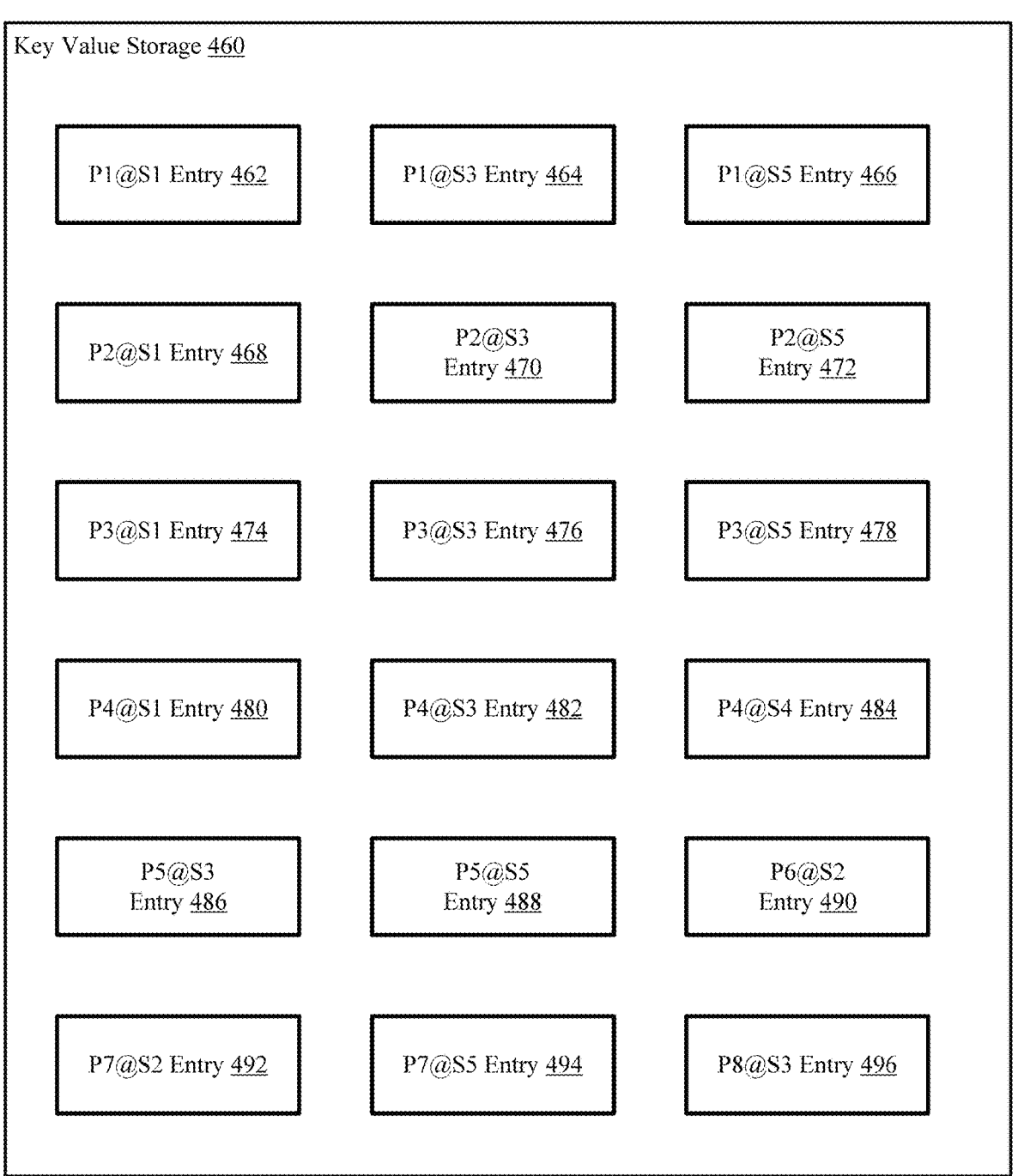
Figure 4C:
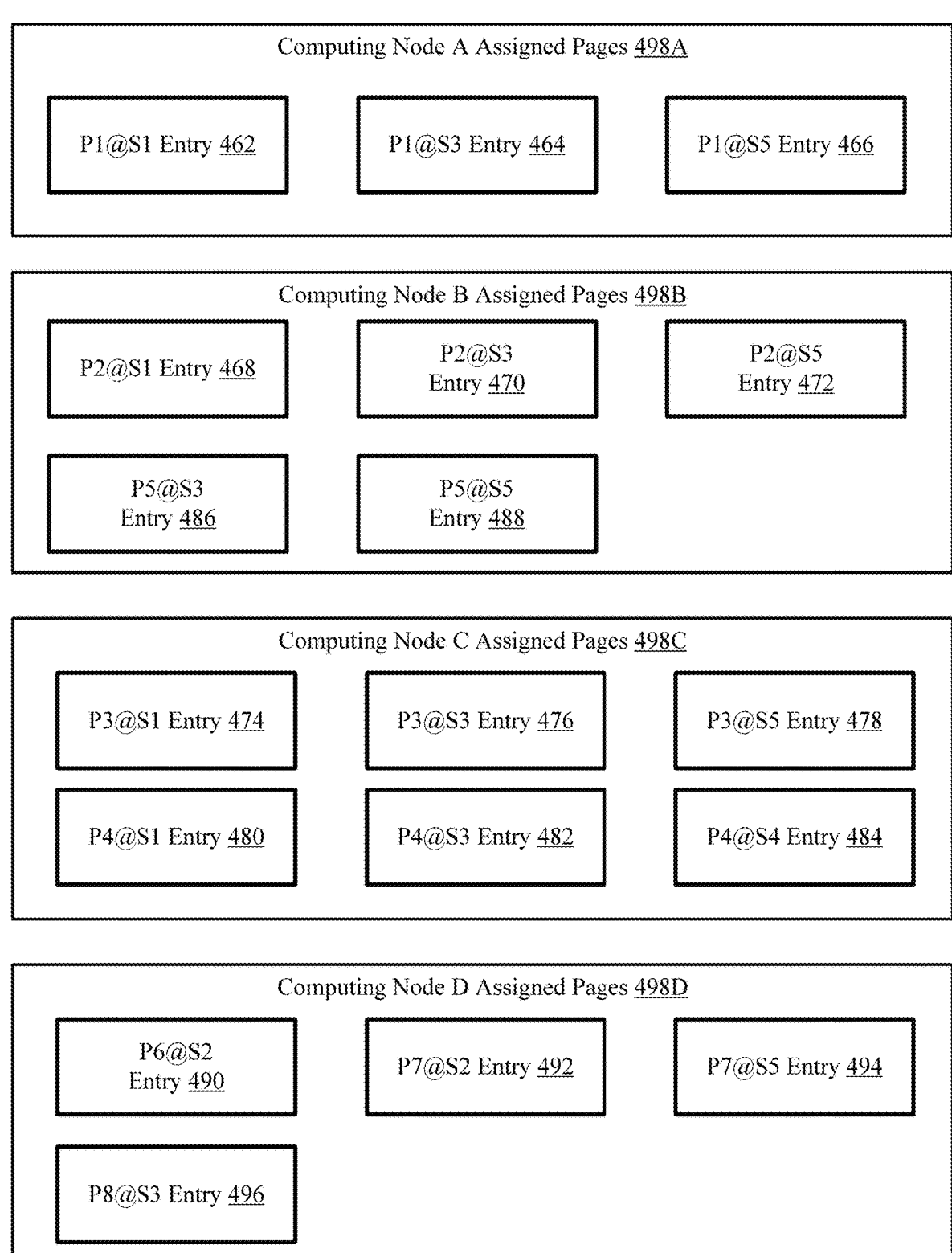

To clarify aspects of the invention, the following describes an example in accordance with one or more embodiments of the invention. The example, described using FIGS. 4A-4C, is not intended to limit aspects of the invention. In the example, consider a scenario in which dataless and dataful snapshots of a DNS have been generated, and may be used by users to access data of the DNS.

Turning to the example and to FIG. 4A, FIG. 4A includes five snapshots (400, 402, 404, 406, 408, 410). The arrows point to the children pages of a corresponding parent page. Snapshot S1 (400) captures four pages of the DNS, P1@1 (420), P2@1 (422), P3@1 (424), and P4@1 (426) in a B+tree hierarchical structure; S2 (402) is a deleted dataful snapshot that was generated with pages P6@2 (438) and P7@2 (440). Though S2 (402) is deleted, the two pages (438, 440) are listed due to being reference in other snapshots (see S3 (404)). S3 (404) is a dataless snapshot that specifies pages P1@3 (428), P2@3 (430), P5@3 (432), P3@3 (434), P4@3 (436), P6@2 (438), P7@2 (440), and P8@3 (442), etc. All pages of each snapshot may be stored in a key value storage (KVS) described in FIG. 4B.

To clarify the naming convention of the pages, the number following the "P" (e.g., the "2" in P2@S1) describes the page identifier within the DNS. The number following the "@" describes the snapshot identifier for the snapshot that was generated when the corresponding page was generated.

Turning to FIG. 4B, FIG. 4B shows a diagram of the key value storage (460) that stores entries each associated with a page of one or more of the snapshots discussed above in FIG. 4A. Each entry (462, 464, 466, 468, 470, 472, 474, 476, 478, 480, 482, 484, 486, 488, 490, 492, 494, 496) maps a unique page (e.g., key) to corresponding data and/or metadata (e.g., the value).

As an example, the P1@S1 entry (462) corresponds to the P1@S1 (420, FIG. 4A) page. The P1@S1 entry (462) specifies the page identifier, the snapshot identifier of the snapshot in which the page was generated, and the corresponding value. The corresponding value of P1@S1 entry (462) is a list of child pages since P1@S1 is an internal page. The list of child pages of P1@S1 includes P2@S1 (422, FIG. 4A).

As another example, the P4@S1 entry (480) corresponds to the P4@S1 (426, FIG. 4A) page. The P4@S1 entry (462) specifies the page identifier, the snapshot identifier of the snapshot in which the page was generated, and the corresponding value. The corresponding value of P4@S1 entry (480) is a list of files of the payload data associated with P4@S1. Further, given that P4@S1 is generated with a dataful snapshot, the value stored in the P4@S1 entry (462) further includes the file data of the list of files.

Consider a scenario in the example in which a DNS system (not shown in FIGS. 4A-4B) performs data management of its distributed storage by identifying the file data being used and/or referenced by the pages of all present snapshots in FIG. 4A and deleting any data that is not referenced by any page in the present snapshots. To perform the data management, each entry (462, 464, 466, 468, 470, 472, 474, 476, 478, 480, 482, 484, 486, 488, 490, 492, 494, 496) may be assigned to one of four DNS computing nodes of the DNS system. The assignment of pages may be performed by any one of the four computing nodes for all four computing nodes. The assignment of the pages for each of the four computing nodes is illustrated in FIG. 4C.

FIG. 4C shows a diagram of assigned pages for each of four computing nodes. Computing node A processes P1@S1 entry (462), P1@S3 entry (464), and P1@S5 entry (466). Computing node B processes P2@S1 entry (468), P2@S3 entry (470), and P2@S5 entry (472), P5@S3 (486), and P5@S5 entry (488), etc. Each computing node (498A, 498B, 498C, 498D) performs the method of FIGS. 3A-3B to process the corresponding assigned pages to determine a subset of pages to be used for physical enumeration and data management.

To clarify the page processing of the page entries, the following description describes example page processing of a collection of pages to determine whether each page is to be further processed using the physical enumeration. The following description refers to FIG. 4A for clarity.

Returning to FIG. 4A, page P3@S1 (424) (assigned to computing node C (498C)) is processed for physical enumeration due to this page being generated from a present dataful snapshot and for being a leaf page.

In contrast, pages P6@S2 (438) and P7@S2 (440) (both assigned to computing node D (498D)) are not assigned for physical enumeration based on these pages being generated by a now deleted snapshot S2 (402). However, P6@S2 is referenced by at least one dataful snapshot S5 (410) and is a child to P5@S5 (450). The P5@S5 entry is assigned to computing node B (498B). Based on the processing of FIG. 3A-3B, the child pages of P5@S5 (450) would be processed by the one assigned to P5@S5 (450) (i.e., computing node B (498B)). The child pages include P6@S2 (438), P7@S5 (454), and P8@S3 (442). Though these child pages are not assigned to computing node B (498B), they are processed through the processing of their parent page P5@S5 in accordance with FIG. 3B. Referencing FIG. 3B, a corresponding P1 and P2 values are obtained for each child page (438, 454, 442). Based on the processing in accordance with steps 324-330 of FIG. 3B, P6@S2 (438) is a leaf page previously associated with a dataless snapshot, so the physical enumeration is applied to P6@S2 (438) as determined by computing node B (498B). Similarly, page P8@S3 (442) is assigned for physical enumeration based on being a child page to a page of a dataful snapshot and its previous present snapshot being a dataless snapshot, S3 (404).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computer (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention enable efficient data management of a distributed namespace (DNS) by processing a large number of pages from multiple snapshots of the DNS. The efficient data management is enabled by assigning a subset of all pages to each of a plurality of computing nodes for parallel processing. Embodiments of the invention reduce the use of logical walks of the assigned pages by determining a subset of the assigned pages that is used for physical enumeration. To prevent redundancies in physical enumeration of pages, embodiments provide an algorithm for determining the subset of the assigned pages by not including any pages that are not referenced in dataful snapshots, and filtering those referenced by multiple snapshots such that only one of the computing nodes includes a given page in the subset of pages for physical enumeration. By providing a method for enabling parallel processing of a DNS while reducing redundancies, embodiments of the invention improve the operation of the computing devices by efficiently managing computing resource use by a DNS system of computing devices providing services using the DNS.

Thus, embodiments of the invention may address the problem of inefficient use of computing resources. This problem arises due to the technological nature of the environment in which file systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a garbage collection (GC) agent of a computing node in a distributed namespace (DNS) system, a request for processing a set of pages in a file system, wherein each page in the set of pages is associated with one of a plurality of snapshots,
wherein each of the plurality of snapshots is either a dataless or dataful snapshot;
in response to the request:
performing a page processing on each page in the set of pages based on an association to a dataless or dataful snapshot of each page to obtain a subset of the pages; and
performing, using a data manager of the computing node, a physical enumeration of the subset of the pages to obtain a managed storage of the DNS system,
wherein the managed storage is cleaned based on data not associated with the subset of pages.

2. The method of claim 1, wherein the page processing comprises:
selecting a first page of the set of pages for processing;
making a first determination that the first page corresponds to a first present snapshot;
based on the first determination, making a second determination that the first present snapshot is a dataful snapshot and that the first page is a leaf page; and
based on the second determination, updating the subset of pages with the first page.

3. The method of claim 2, further comprising:
selecting a second page of the set of pages for processing;
making a third determination that the second page corresponds to the first present snapshot;
based on the third determination, making a fourth determination that the second page is an internal page;
based on the fourth determination, making a fifth determination that a previous present snapshot of the second page is a dataless snapshot;
based on the fifth determination, obtaining additional information for child pages of the internal page;
performing an additional processing on the child pages using the additional information to obtain a subset of the child pages; and
performing the page processing on the subset of the child pages.

4. The method of claim 3, wherein the additional information comprises: a previous present dataless snapshot identifier associated with each of the child pages, a previous present dataful snapshot identifier, and a previous present dataless snapshot identifier, and wherein the additional processing comprises identifying the subset of the child pages based on each subset of the child pages being associated with a snapshot identifier that is greater than or equal to the previous present dataless snapshot identifier and greater than the previous present dataful snapshot identifier.

5. The method of claim 1, wherein the set of pages is a portion of all pages in the plurality of snapshots.

6. The method of claim 1, wherein the set of pages is assigned to the computing node by a second computing node in the DNS system.

7. The method of claim 1, wherein performing the physical enumeration comprises:

selecting a first page of the subset of pages;

identifying file data associated with the first page and stored in the DNS system; and initiating protection of the file data to prevent the data from being cleaned.

8. A non-transitory computer readable medium comprising computer readable program code, which when executed by a computer processor enables the computer processor to perform a method for recovery of a portion of a backup image, the method comprising:

obtaining, by a garbage collection (GC) agent of a computing node in a distributed namespace (DNS) system, a request for processing a set of pages in a file system, wherein each page in the set of pages is associated with one of a plurality of snapshots, wherein each of the plurality of snapshots is either a dataless or dataful snapshot;

in response to the request:

performing a page processing on each page in the set of pages based on an association to a dataless or dataful snapshot of each page to obtain a subset of the pages; and performing, using a data manager of the computing node, a physical enumeration of the subset of the pages to obtain a managed storage of the DNS system, wherein the managed storage is cleaned based on data not associated with the subset of pages.

9. The non-transitory computer readable medium of claim 8, wherein the page processing comprises:

selecting a first page of the set of pages for processing;

making a first determination that the first page corresponds to a first present snapshot;

based on the first determination, making a second determination that the first present snapshot is a dataful snapshot and that the first page is a leaf page; and based on the second determination, updating the subset of pages with the first page.

10. The non-transitory computer readable medium of claim 9, further comprising:

selecting a second page of the set of pages for processing;

making a third determination that the second page corresponds to the first present snapshot;

based on the third determination, making a fourth determination that the second page is an internal page;

based on the fourth determination, making a fifth determination that a previous present snapshot of the second page is a dataless snapshot;

based on the fifth determination, obtaining additional information for child pages of the internal page;

performing an additional processing on the child pages using the additional information to obtain a subset of the child pages; and performing the page processing on the subset of the child pages.

11. The non-transitory computer readable medium of claim 10, wherein the additional information comprises: a previous present dataless snapshot identifier associated with each of the child pages, a previous present dataful snapshot identifier, and a previous present dataless snapshot identifier, and wherein the additional processing comprises identifying the subset of the child pages based on each subset of the child pages being associated with a snapshot identifier that is greater than or equal to the previous present dataless snapshot identifier and greater than the previous present dataful snapshot identifier.

12. The non-transitory computer readable medium of claim 8, wherein the set of pages is a portion of all pages in the plurality of snapshots.

13. The non-transitory computer readable medium of claim 8, wherein the set of pages is assigned to the computing node by a second computing node in the DNS system.

14. The non-transitory computer readable medium of claim 8, wherein performing the physical enumeration comprises:

selecting a first page of the subset of pages;

identifying file data associated with the first page and stored in the DNS system; and initiating protection of the file data to prevent the data from being cleaned.

15. A system comprising:

a computing node in a distributed namespace (DNS) system, operating on a processor; and memory comprising instructions, which when executed by the processor, perform a method comprising:

obtaining, by a garbage collection (GC) agent of the computing node, a request for processing a set of pages in a file system, wherein each page in the set of pages is associated with one of a plurality of snapshots, wherein each of the plurality of snapshots is either a dataless or dataful snapshot;

in response to the request:

performing a page processing on each page in the set of pages based on an association to a dataless or dataful snapshot of each page to obtain a subset of the pages; and performing, using a data manager of the computing node, a physical enumeration of the subset of the pages to obtain a managed storage of the DNS system, wherein the managed storage is cleaned based on data not associated with the subset of pages.

16. The system of claim 15, wherein the page processing comprises:

selecting a first page of the set of pages for processing;

making a first determination that the first page corresponds to a first present snapshot;

based on the first determination, making a second determination that the first present snapshot is a dataful snapshot and that the first page is a leaf page; and based on the second determination, updating the subset of pages with the first page.

17. The system of claim 16, further comprising:

selecting a second page of the set of pages for processing;

making a third determination that the second page corresponds to the first present snapshot;

based on the third determination, making a fourth determination that the second page is an internal page;

based on the fourth determination, making a fifth determination that a previous present snapshot of the second page is a dataless snapshot;

based on the fifth determination, obtaining additional information for child pages of the internal page;

performing an additional processing on the child pages using the additional information to obtain a subset of the child pages; and performing the page processing on the subset of the child pages.

18. The system of claim 17, wherein the additional information comprises: a previous present dataless snapshot identifier associated with each of the child pages, a previous present dataful snapshot identifier, and a previous present dataless snapshot identifier, and wherein the additional processing comprises identifying the subset of the child pages based on each subset of the child pages being associated with a snapshot identifier that is greater than or equal to the previous present dataless snapshot identifier and greater than the previous present dataful snapshot identifier.

19. The system of claim 15, wherein the set of pages is a portion of all pages in the plurality of snapshots, wherein the set of pages is assigned to the computing node by a second computing node in the DNS system.

20. The system of claim 15, wherein performing the physical enumeration comprises:

selecting a first page of the subset of pages;

identifying file data associated with the first page and stored in the DNS system; and initiating protection of the file data to prevent the data from being cleaned.

\* \* \* \* \*